(12) United States Patent
Anand et al.

(10) Patent No.: US 8,252,091 B2
(45) Date of Patent: Aug. 28, 2012

(54) CO₂ RECOVERY FROM IGCC POWER PLANTS

(75) Inventors: Ashok Kumar Anand, Niskayuna, NY (US); Chetan Madhav Joshi, Bangalore (IN); Jegadeesan Maruthamuthu, Dindigul (IN)

(73) Assignee: General Electric Company, Schenectady, NY (US)

( * ) Notice: Subject to any disclaimer, the term of this patent is extended or adjusted under 35 U.S.C. 154(b) by 912 days.

(21) Appl. No.: 12/076,386

(22) Filed: Mar. 18, 2008

(65) Prior Publication Data

US 2009/0235822 A1    Sep. 24, 2009

(51) Int. Cl.
*B01D 53/14*    (2006.01)

(52) U.S. Cl. ............... 95/172; 95/177; 95/192; 95/208; 95/236

(58) Field of Classification Search .............. 96/195; 95/261, 172, 177, 192, 208, 236
See application file for complete search history.

(56) References Cited

U.S. PATENT DOCUMENTS

| | | | |
|---|---|---|---|
| 4,581,052 A * | 4/1986 | Adler et al. ............ | 62/535 |
| 4,946,477 A | 8/1990 | Perka | |
| 4,957,515 A * | 9/1990 | Hegarty ............... | 95/162 |
| 5,240,476 A | 8/1993 | Hegarty | |
| 6,090,356 A * | 7/2000 | Jahnke et al. ............ | 423/210 |
| 6,488,076 B1 | 12/2002 | Yasuda | |
| 6,655,150 B1 | 12/2003 | Asen | |
| 7,083,658 B2 | 8/2006 | Andrus Jr. | |
| 7,282,189 B2 | 10/2007 | Zauderer | |
| 7,314,847 B1 | 1/2008 | Siriwardane | |
| 2006/0260189 A1 | 11/2006 | Reddy | |

FOREIGN PATENT DOCUMENTS

| | | |
|---|---|---|
| EP | 1 695 756 | 8/2006 |
| GB | 2 457 950 | 9/2009 |

OTHER PUBLICATIONS

Ciferno, Jared P.; "2006 Cost & Performance Comparison of Fossil Energy Power Plants"; 31st International Technical Conference on Coal Utilization & Fuel Systems; Clearwater, FL May 21-25, 2006; 31 pages (see p. 16).
French Office Action dated Dec. 15, 2011, issued in counterpart French Application No. 0951531 with English translation.

* cited by examiner

*Primary Examiner* — Duane Smith
(74) *Attorney, Agent, or Firm* — Nixon & Vanderhye P.C.

(57) ABSTRACT

In a system involving $CO_2$ capture having an acid gas removal system to selectively remove $CO_2$ from shifted syngas, the acid gas removal system including at least one stage, e.g. a flash tank, for $CO_2$ removal from an input stream of dissolved carbon dioxide in physical solvent, the method of recovering $CO_2$ in the acid gas removal system including: elevating a pressure of the stream of dissolved carbon dioxide in physical solvent; and elevating the temperature of the pressurized stream upstream of at least one $CO_2$ removal stage.

9 Claims, 7 Drawing Sheets

_US 8,252,091 B2_

CO$_2$ RECOVERY FROM IGCC POWER PLANTS

BACKGROUND OF THE INVENTION

Carbon Dioxide (CO$_2$) emitted from power plants is considered to be a greenhouse gas that needs to be removed and sequestered. In the present Integrated Gasification Combined Cycle (IGCC) technology pre-combustion capture of CO$_2$ is preferred. IGCC plants with CO$_2$ capture and removal currently employ a physical solvent such as SELEXOL™, a trademark of Union Carbide Corporation, by absorption/de-absorption process for capturing and removing carbon as carbon dioxide from syngas fuel. More specifically, syngas produced from the gasifier is sent to a set of shift reactors in order to convert CO into CO$_2$ and H$_2$. Then with the use of a physical solvent such as SELEXOL™, CO$_2$ is captured. After de-absorption the captured CO$_2$ can be recovered.

Carbon dioxide removed by this process comes out as a gaseous product at low pressure (15 to 300 psia). This recovered CO$_2$ needs to be stored in liquid state at high pressures (on the order of 2000 psia). Thus, the gaseous CO$_2$ is pressurized and then cooled using refrigerants. This liquefies the gas and then it is pumped to high pressures.

The gaseous compression of carbon dioxide requires large amounts of auxiliary compression power, which results in lower plant net output and efficiency.

FIG. 1 depicts a Block Flow Diagram of a typical IGCC system involving CO$_2$ capture based on the current art and includes the following major process steps:

A. A high pressure Radiant Only Gasifier 10 with water quench of the syngas to maximize sensible heat recovery.
B. An air separation unit 12 to produce 95% purity oxygen required for gasification using Elevated Pressure (EP) ASU with partial air extraction from the GT.
C. A single/two stage catalytic Water-Gas-Shift reactor 14 to produce a predominantly H2-CO$_2$ rich gas.
D. Product gas cleaning, H$_2$S removal and sulfur recovery 16 and to capture CO$_2$ present in the fuel thus de-carbonizing the fuel going to the Gas Turbine 18.
E. Power generation using an advanced syngas-fueled gas turbine power cycle.

The current art uses a two-column acid gas removal (AGR) system 20 to selectively remove H$_2$S and CO$_2$ from the shifted syngas.

FIG. 2 illustrates the present two-column AGR system 20. The encircled portion of the scheme relates to recovery of the captured CO$_2$ from the physical solvent. In the current art, as depicted in the FIG. 3, the configuration has three different pressure stages 22,24,26 in order to flash out the CO$_2$ gas from the physical solvent 28.

BRIEF DESCRIPTION OF THE INVENTION

The invention employs a liquid pump to increase the pressure in the liquid state of the dissolved carbon dioxide in physical solvent to much higher pressures before deabsorption as gaseous product at lower pressures.

Thus, the invention may be embodied in a system involving CO$_2$ capture having an acid gas removal system to selectively remove CO$_2$ from shifted syngas, the acid gas removal system including: at least one stage for CO$_2$ removal from an input stream of dissolved carbon dioxide in physical solvent; a pump for elevating a pressure of the stream of dissolved carbon dioxide in physical solvent; and a heat exchanger for elevating the temperature of the pressurized stream upstream of at least one said CO$_2$ removal stage.

The invention may also be embodied in a method of recovering CO$_2$ in an acid gas removal system to selectively remove CO$_2$ from shifted syngas in a system involving CO$_2$ capture, the acid gas removal system including at least one stage for CO$_2$ removal from an input stream of dissolved carbon dioxide in physical solvent, the method of recovering CO$_2$ in the acid gas removal system including: elevating a pressure of the stream of dissolved carbon dioxide in physical solvent; and elevating the temperature of the pressurized stream upstream of at least one said CO$_2$ removal stage.

DETAILED DESCRIPTION OF THE INVENTION

Figure 1:
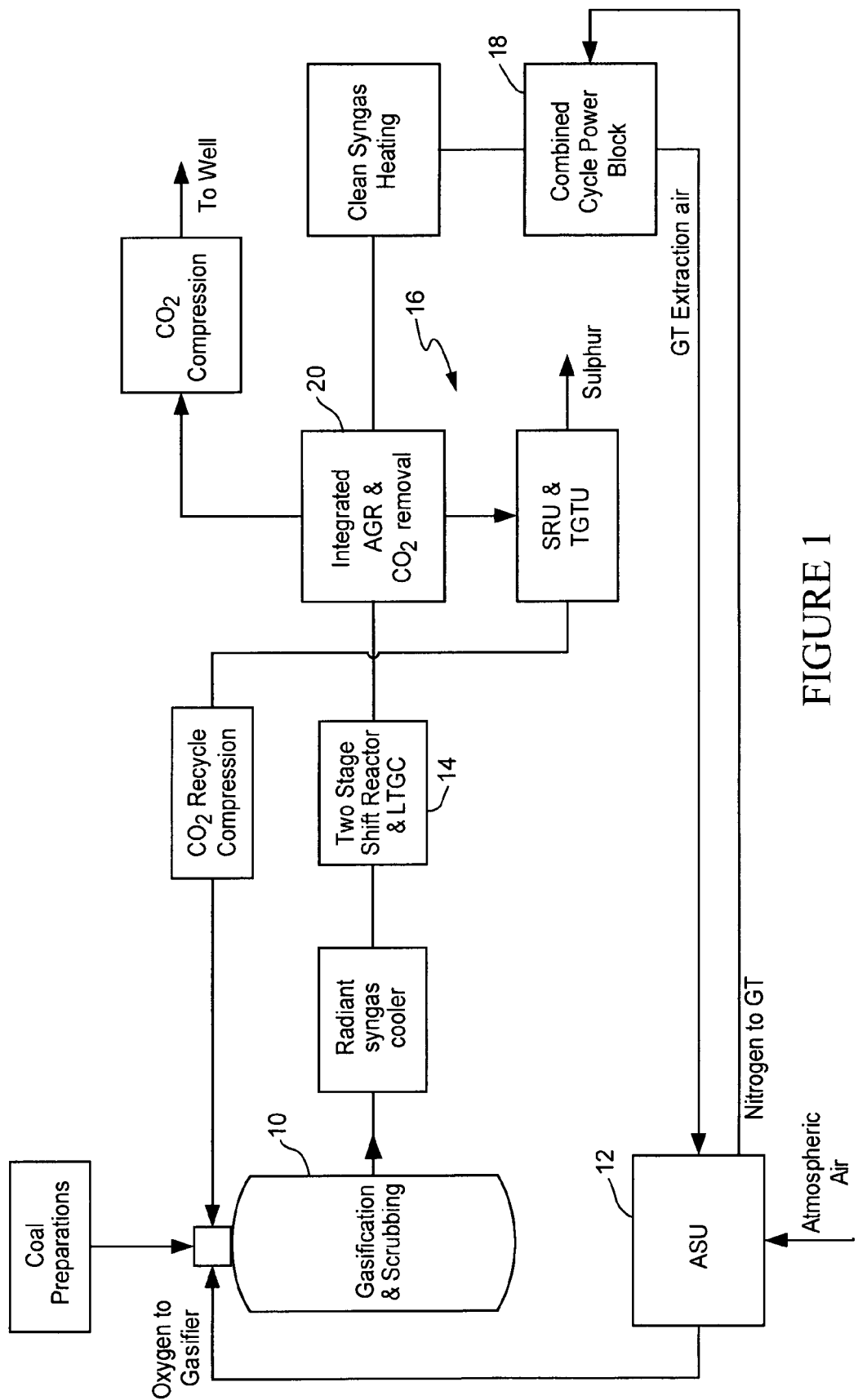
FIG. 1 is a schematic illustration of an IGCC system involving CO$_2$ capture.
Figure 2:
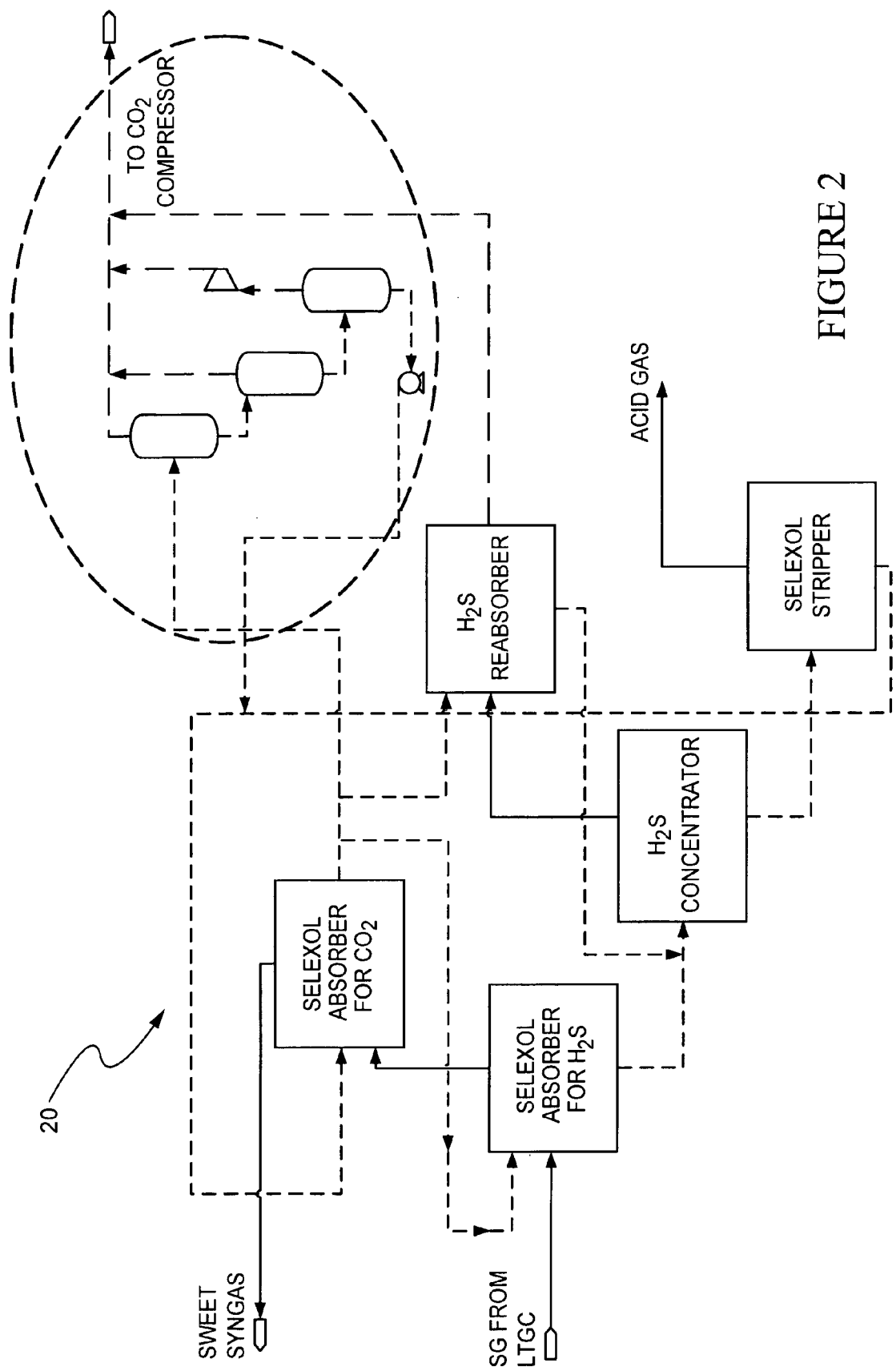
FIG. 2 is a schematic illustration of an AGR system for the FIG. 1 IGCC system involving CO$_2$ capture.
Figure 3:
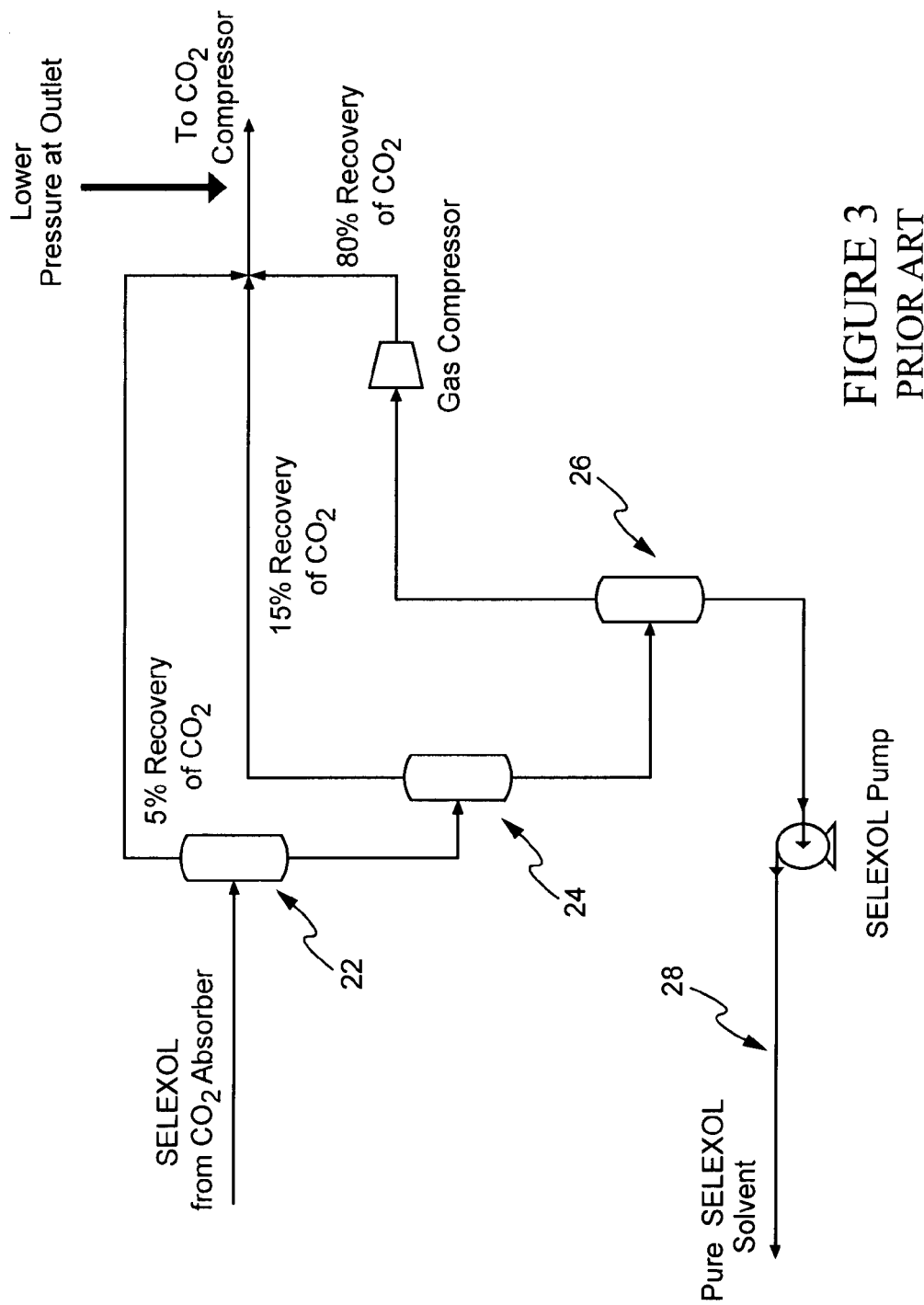
FIG. 3 is a schematic illustration of the encircled portion of FIG. 2 illustrating conventional CO$_2$ recovery in the AGR system of FIG. 2.

The efficiency of an IGCC system with CO$_2$ capture is reduced due to the AGR configuration conventionally used, the details of which were discussed above with reference to FIG. 3. The key reasons for this performance penalty are due to the lower CO$_2$ stream pressure, which drives higher CO$_2$ compressor auxiliary loads. The invention proposes system design solutions to reduce auxiliary loads of a SELEXOL™ based AGR system thereby improving the IGCC system net output and heat rate.

The invention is based on the property of the physical solvent to release the captured gas at a higher rate at elevated temperature even though the pressure of the solvent is high. Thus the invention proposes to elevate the pressure of the solvent and then raise its temperature, e.g., by sending it through a set of heat exchangers. This ensures a higher quantity of gas being stripped at the higher pressure, thus reducing the auxiliary power required in the CO$_2$ compressor. The temperature required to strip the gas from the solvent is directly proportional to the solvent pressure. A temperature of 200 degrees Fahrenheit can be achieved by a low-grade energy source, such as syngas going for trim cooling, and various compressor streams getting cooled in after coolers.

In the alternative, various high temperature energy sources available in the plant may be utilized to strip the gas at much higher pressures by replacing the low-grade energy heating by a high-grade energy source such as the LP steam, HP Steam, etc.

Figure 4:
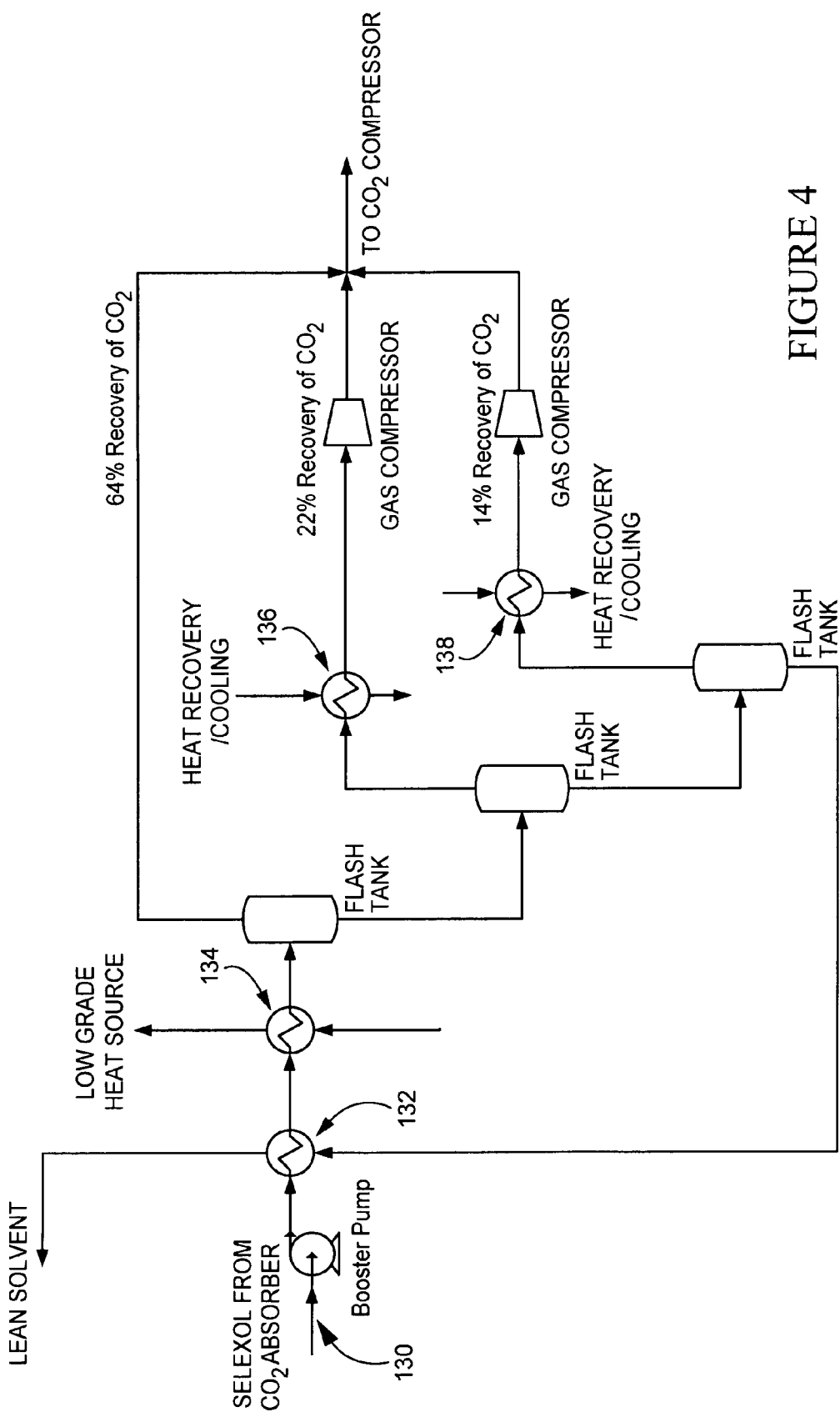
FIG. 4 is a schematic illustration of the encircled portion of the FIG. 2 AGR system illustrating CO$_2$ recovery in the AGR system according to an example embodiment of the invention.

The modified CO$_2$ recovery in the AGR system provided according to an example embodiment of the invention is schematically illustrated in FIG. 4. As depicted therein, the basic difference between the conventional scheme of FIG. 3 and the scheme of the embodiment of FIG. 4 is the addition of a booster pump and a heat exchanger network. In this example embodiment, the booster pump is a regular centrifugal pump 130 to raise the pressure of the input liquid stream. The heat exchangers 132,134,136,138 are then used to heat the boosted solvent stream. The main source of heating can be all sources of low-grade energy. More particularly, since the temperature required for getting the captured $CO_2$ stripped away from the solvent are low, all low-grade energy sources can be used. As noted above, even a temperature of 200° F. will give significant improvement in the recovery of the gas at higher pressure.

Thus, the invention employs a liquid pump 130, first to increase the pressure in the liquid state of the dissolved carbon dioxide and physical solvent to much higher pressures such as 1200 to 2500 psia before de-absorption as gaseous product. The increased gaseous pressure of removed carbon dioxide as compared to a system without liquid pumping, results in much lower compression power consumption and cost to final carbon dioxide sequestration state. Thus, according to the invention, carbon dioxide removal auxiliary power can be reduced by up to 18% by effectively replacing (some) gaseous compression with liquid compression when the $CO_2$ is dissolved in liquid state.

Figure 5:
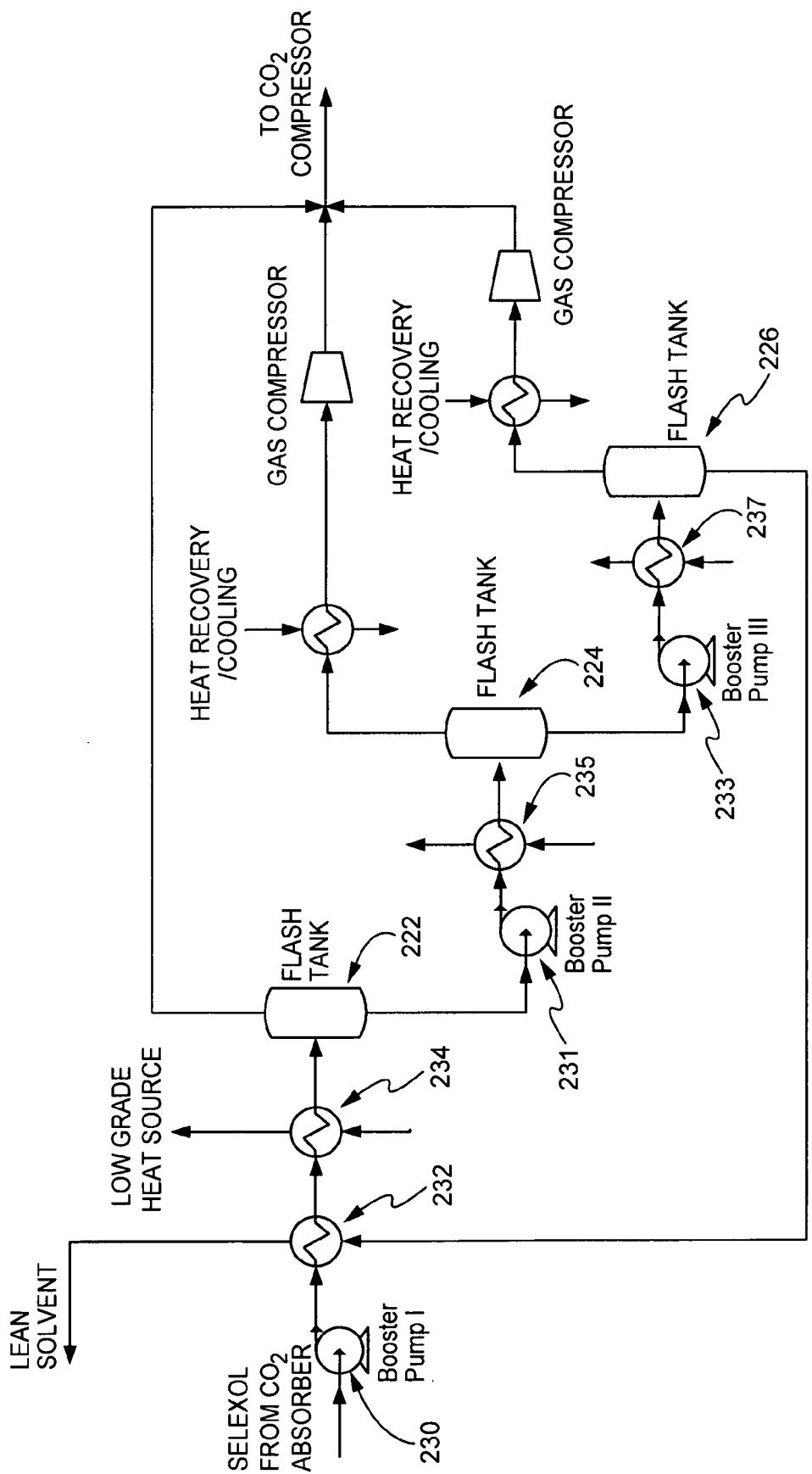
FIG. 5 is an illustration of CO$_2$ recovery in an AGR system according to an alternate embodiment of the invention, with inter-stage pumping.

FIG. 5 illustrates an alternate embodiment for $CO_2$ recovery in a AGR system wherein inter-stage pumping 231,233 with heating 235,237 is provided in addition to pump 230, as an alternative to a single booster pump 130 as in the FIG. 4 embodiment. It is noted that in each case where a booster pump is provided, the heat exchange system incorporates at least one heat exchanger 232,234,235,237 downstream of the booster pump and upstream of the respective flash tank 222, 224,226 for elevating the temperature of the pressurized solvent consistent with the staged increase in the pressure of the liquid.

Some preliminary simulations were done to evaluate the benefits of the inventions described hereinabove using ASPEN HYSYS, a commercial simulation software product of Aspen Technology Inc., Cambridge, Mass.

For the evaluation, various scenarios were considered to find the variation and benefit with the variation in the pressure levels in the three stages. In all scenarios, the temperature after heating is maintained the same.

TABLE 1

SCENARIOS FOR EVALUATION

|  | Base Case | Scenario 1 | Scenario 2 | Scenario 3 | Scenario 4 |
|---|---|---|---|---|---|
| Booster Pump Discharge P(psia) | 512 | 545 | 650 | 730 | 800 |
| I Stage P (psia) | 295 | 295 | 445 | 470 | 595 |
| II Stage P (psia) | 195 | 195 | 245 | 270 | 295 |
| III Stage P (psia) | 48 | 145 | 142.6 | 142.35 | 141.6 |

Figure 6:
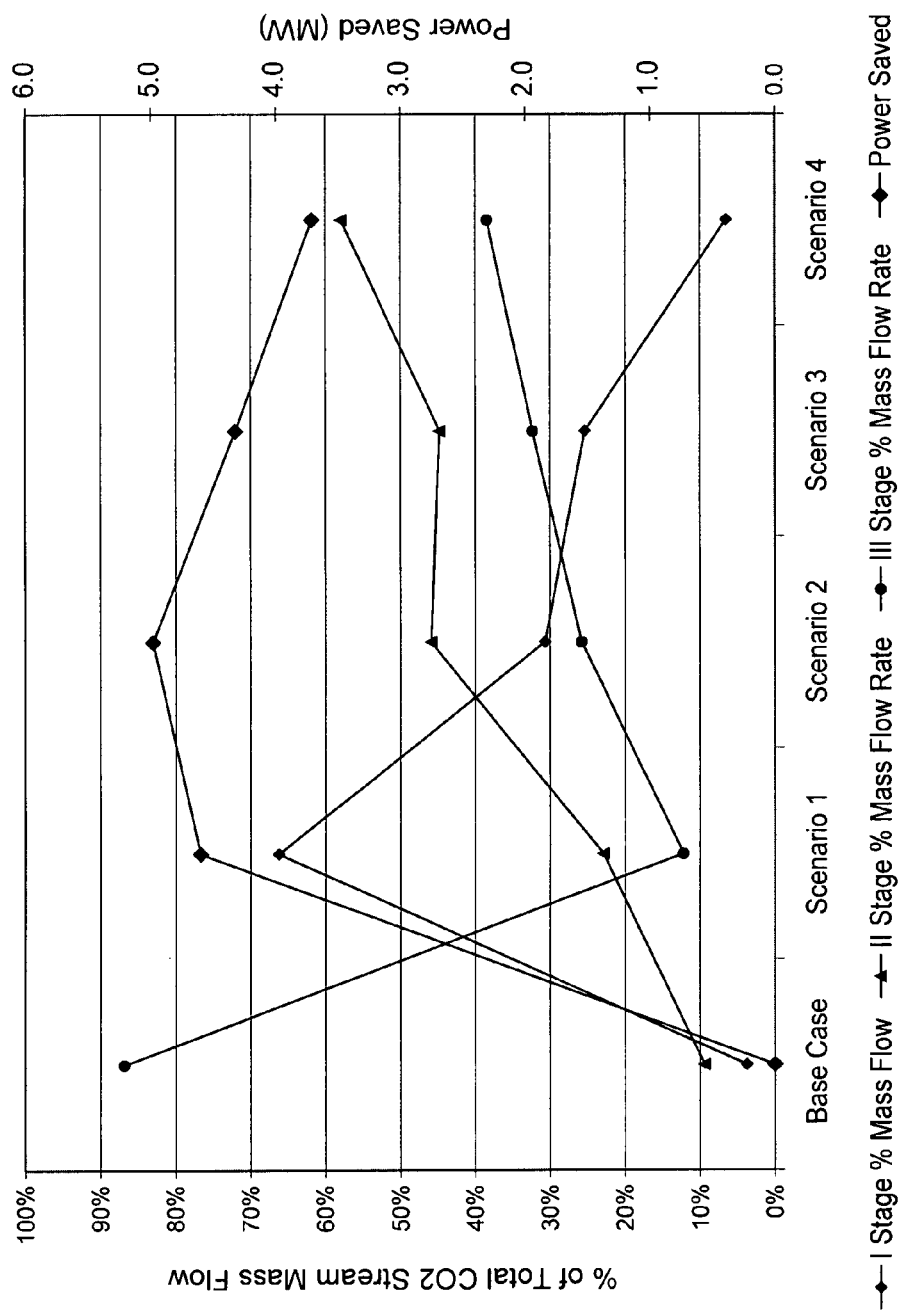
FIG. 6 is a graph illustrating power savings according to different scenarios and variation in percent recovery in different stages.

The results observed in these simulations are depicted in FIG. 6. Specifically, FIG. 6 depicts power savings in the different scenarios and variation in percent recovery in the different stages.

Figure 7:
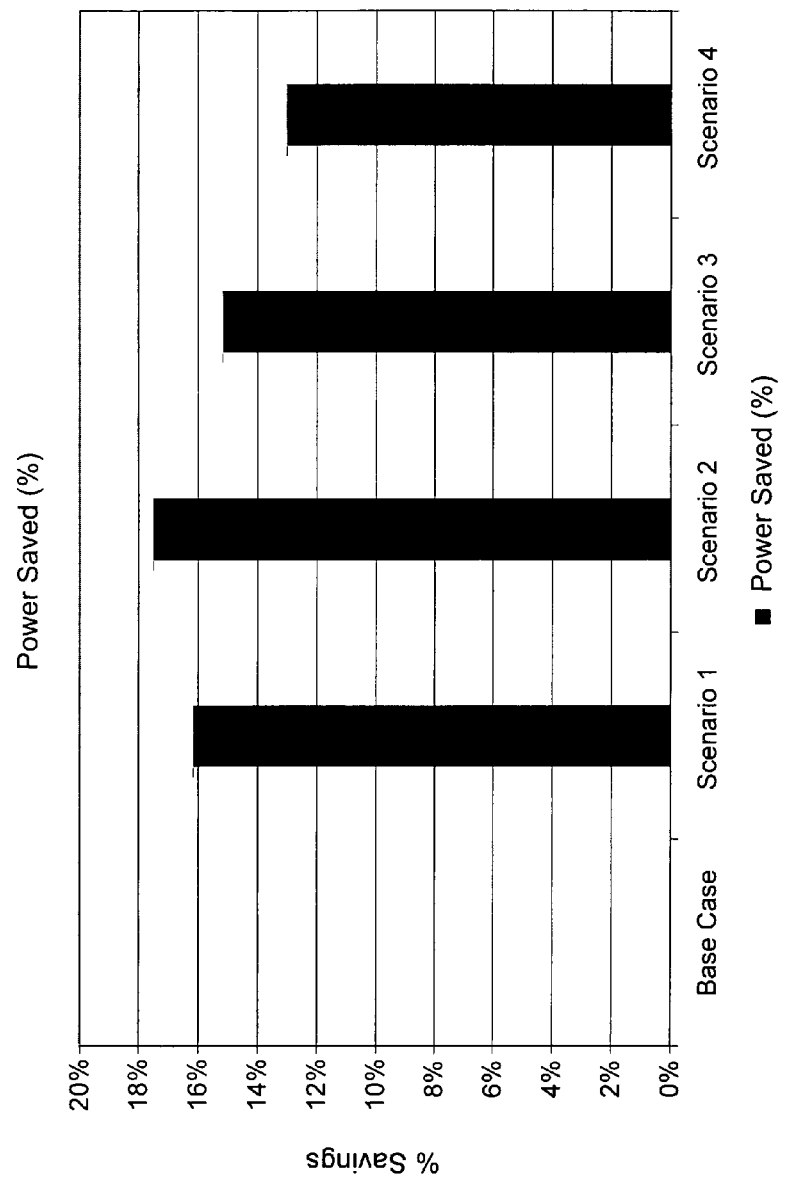
FIG. 7 is a graphical illustration of power savings according to different scenarios.

The percent savings in auxiliary power in the different scenarios is shown in FIG. 7.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while three stages of $CO_2$ removal has been shown in an example embodiment of the invention, the invention is valid and effective for a $CO_2$ removal system with one or more stages. Moreover, this $CO_2$ separation process could also be used in manufacture of liquid transportation fuels and/or multichemical products including hydrogen, Ammonia fertilizer etc. from coal or similar hydrocarbon feedstocks using gasification technology, where power production or IGCC is not a must. Thus, the invention is not limited to $CO_2$ removal in an IGCC system, but rather may be used in any system that generates $CO_2$. Additionally, although SELEXOL™ is specifically referenced as an example working fluid, other liquid solvents could be used. Finally, while as noted above low grade energy is the preferred way to elevate temperature of the solvent stream to remove $CO_2$, in some instances other energy sources such as LP/IP or HP steam may be available and/or needed to maximize $CO_2$ removal efficiency.

What is claimed is:

1. In a system involving $CO_2$ capture having an acid gas removal system to selectively remove $CO_2$ from shifted syngas, the acid gas removal system including at least one stage for $CO_2$ removal from an input stream consisting of substantially only dissolved carbon dioxide in physical solvent, the method of recovering $CO_2$ in the acid gas removal system including:
  elevating a pressure of said input stream of dissolved carbon dioxide in physical solvent to produce a pressurized stream upstream of said at least one $CO_2$ removal stage; and
  elevating the temperature of the pressurized stream upstream of at least one said $CO_2$ removal stage.

2. The method of claim 1, wherein said elevating a pressure comprises feeding the stream through a centrifugal pump.

3. The method of claim 1, wherein said elevating the temperature of the pressurized stream comprises feeding the solvent stream through a heat exchanger.

4. The method of claim 3, wherein said heat exchanger is operatively coupled to at least one low-grade energy source for heating the pressurized stream.

5. The method of claim 4, wherein one of said low grade sources comprises lean physical solvent recovered in said acid gas removal system.

6. The method of claim 1, wherein there are a plurality of $CO_2$ removal stages and the solvent stream is elevated in pressure and elevated in temperature upstream of each said $CO_2$ removal stage.

7. The method of claim 1, further comprising reducing the temperature of the recovered $CO_2$ downstream of at least one said $CO_2$ removal stage.

8. The method of claim 7, wherein there are three stages of flash tanks for $CO_2$ removal, and a heat exchanger for reducing the temperature of the recovered $CO_2$ is disposed downstream of the second and third stage flash tanks.

9. The method of claim 1, wherein recovered $CO_2$ is compressed downstream of at least one said $CO_2$ removal stage in preparation for storage and sequestration.

* * * * *